United States Patent
Dolson et al.

(10) Patent No.: US 9,349,052 B2
(45) Date of Patent: *May 24, 2016

(54) AUTOMATIC PHOTO ALBUM CREATION BASED ON SOCIAL INFORMATION

(71) Applicant: Facebook, Inc., Menlo Part, CA (US)

(72) Inventors: Jennifer Dolson, Menlo Park, CA (US); Paul Francois Carduner, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,536

(22) Filed: Dec. 16, 2014

(65) Prior Publication Data

US 2015/0104060 A1    Apr. 16, 2015

Related U.S. Application Data

(63) Continuation of application No. 13/316,168, filed on Dec. 9, 2011, now Pat. No. 8,934,661.

(51) Int. Cl.
| | |
|---|---|
| *G06K 9/62* | (2006.01) |
| *G06K 9/00* | (2006.01) |
| *G06F 17/30* | (2006.01) |

(52) U.S. Cl.
CPC ...... *G06K 9/00677* (2013.01); *G06F 17/30265* (2013.01)

(58) Field of Classification Search
None
See application file for complete search history.

(56) References Cited

U.S. PATENT DOCUMENTS

| | | | |
|---|---|---|---|
| 2012/0014560 A1* | 1/2012 | Obrador et al. | 382/103 |
| 2012/0084655 A1* | 4/2012 | Gallagher et al. | 715/725 |

OTHER PUBLICATIONS

United States Office Action, U.S. Appl. No. 14/572,531, Feb. 3, 2015, fifteen pages.
United States Office Action, U.S. Appl. No. 13/316,168, May 29, 2014, seventeen pages.

* cited by examiner

*Primary Examiner* — Brian P Werner
(74) *Attorney, Agent, or Firm* — Fenwick & West LLP (57) ABSTRACT

A social photo curation system is used to automatically identify a subset of photos for an album to provide to a viewing user. The album and its photos are associated with metadata indicating information about the photos, such as individuals tagged in the photos, locations where the photos were taken, keywords or concepts associated with the photos, and the quality and variety of the photos. The social photo curation system uses this metadata to score and select the photos for a particular viewing user. The scoring and selection of photos for the album may be independent of the viewing user, or it may be customized based on the viewing user's interests and connections to other users in a social networking system.

20 Claims, 3 Drawing Sheets

AUTOMATIC PHOTO ALBUM CREATION BASED ON SOCIAL INFORMATION

CROSS-REFERENCE TO RELATED APPLICATIONS

This application is a Continuation of and claims priority to U.S. patent application Ser. No. 13/316,168 filed on Dec. 9, 2011, which is hereby incorporated by reference in its entirety.

BACKGROUND

This invention relates generally to photo curation, and specifically to photo curation in a social networking environment. Photo curation is a time-consuming exercise. Users may take dozens or hundreds of photos from an event and determine which photos to include in an album or to show to other users in a social network. This determination is typically a painstaking manual process which requires significant effort on the user's part. Moreover, additional manual effort is typically used in a social networking system to determine which photos to show to which of the user's connections and to set access privileges for various connections or groups of connections.

SUMMARY

Embodiments of the invention provide users of a social networking system with a method for automatically curating photos. The photos taken by a user are assessed by the social networking system to determine a variety of scores for the photos. The scores can take into account a user's social network, the photo, and metadata associated with the photo. The metadata can indicate persons in the photo, the location a photo was taken, or any interests depicted in the photo. The scores can also take into account image quality of the photo. The scoring method can also be calculated relative to the relationship between a viewing user and any identified persons, locations, or interests in the photo. Using the scores from the photos in an album, a photo curation system automatically recommends photos from the album which may be of interest to the viewing user.

By using information about the viewing user, the system tailors recommended photos to the information known about a viewing user and the information available about the photo. This improves the likelihood the viewing user is interested in the photos viewed from the album. Other uses for the photo curation system include recommending viewing groups to the uploading user and recommending access privileges.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social photo curation system is presented for automatically curating photos. The automatic photo curation can use social connections, photo quality, photo diversity, location information, interest information, and other information known about a viewing user to determine photos of interest to the viewing user. In a social networking system, a user may have many different photos that the user desires to upload and include in a photo album. Using social factors, a social networking system automatically determines a suggested curation of the album. The photo curation used in this disclosure refers to selecting a subset of a collection of photos likely to be of interest to the viewing user. The social factors can suggest which albums to upload to the social networking system, which photos to show to a particular user, and which photos to provide for various groups of users.

For example, different photos from a user's wedding may be of interest to different people. The wedding ceremony may be of interest to all photo album viewers, while the rehearsal dinner photos may be of interest only to the user's close family, and the afterparty photos may be of interest only to the user's friends. The user may also desire to exclude family members from viewing afterparty photos. Meanwhile, no one is interested in excessively grainy photos or other photos of poor quality, nor would people desire to see multiple photos of the same scene. The social photo curation system provides a method for automatically curating a photo album using social factors derived from these social relationships.

The photos may include certain metadata beyond the raw photo itself. As used herein, metadata broadly includes a photo's textual description, an album name, tags, user interactions with a photo, user comments, a location, and other information associated with a photo.

A tag is an identification of a particular aspect of a photo associated with the photo metadata. These tags can include tagging a user within a photo, which may or may not be confirmed by the tagged user, a location associated with the photo, interests depicted in the photo, or keywords. These tags can be manually identified by users, such as the album creator, the user identified by the tag, or a third party. Tags can also be automatically generated or suggested, such as by tags used in other photos in the album, users' association with currently tagged users in the photo, or by facial recognition of a user. These automatically generated tags are typically confirmed by the person identified by the tag to ensure accuracy and user privacy. Tags can also include automatically generated tags which are not confirmed by users, and may also include tags which are not be expressly visible by users.

As used in this disclosure, a "connection" indicates a relationship between a user and an object in the social networking system, such as another user, a location, interests, or concepts as represented in a social networking system. A connection represented in the social networking system may or may not have a relationship outside of the social networking system. The connections may be explicitly declared by the user or implicitly determined by the social networking system based on user activity. Two users may not have an explicit connection with one another. For example, the connection may merely denote that two users attended the same school, worked at the same place, or are both merely users of the social networking system. Rather, a connection merely indicates the type and degree of relationship indicated on the social networking system between the users. Location connections can relate to permanent location information such as the user's home as stated on a profile, or to transient location information, such as a user's frequency of visiting a particular location. The transient location information can be determined, for example, from the user's check-ins or photo tags with associated locations.

System Framework

Figure 1:
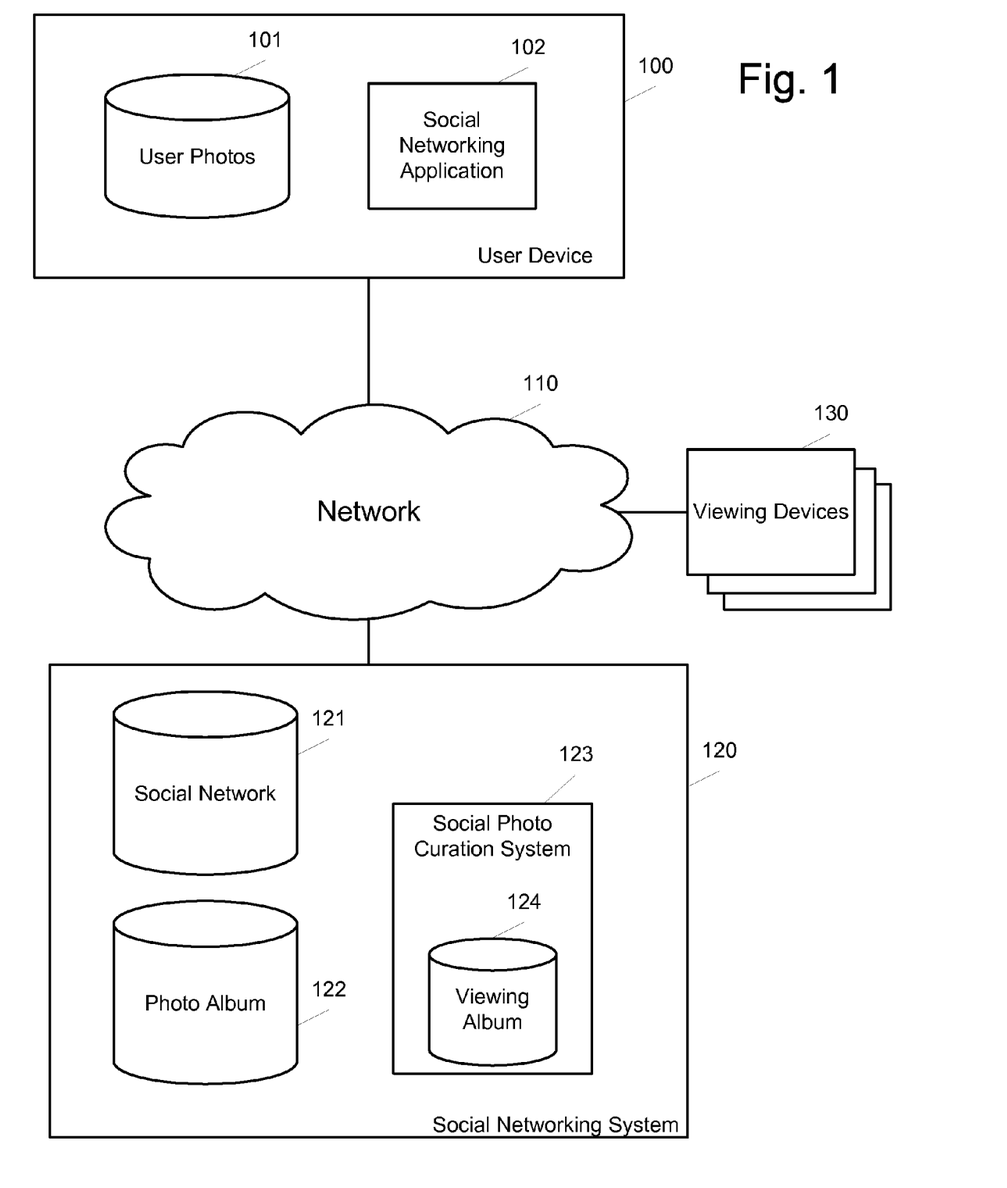
FIG. 1 is an example social networking system which implements a social photo curation system.

A general framework for a social photo curation system according to an embodiment is presented in FIG. 1. As shown in FIG. 1, a user device 100 communicates with a social networking system 120 through a network 110, and the social networking system 120 is also in communication with viewing devices 130. The user device 100 sends a group of photos to the social networking system 120. The social networking system 120 identifies a group of photos to display to the viewing devices 130.

The user device 100 is any device enabling the user to communicate with the social networking system 120. In various embodiments, the user device is a personal computer, a tablet computer, a PDA, a mobile phone, or any other device for interacting with the social networking system 120. The user device 100 includes user photos 101. If the user device 100 includes a camera, the user photos 101 may reflect photos taken by the camera. In alternate embodiments, a separate camera is used and photos are transmitted to the user device 100 and stored in user photos 101. The user photos 101 typically include electronically stored images in a variety of image formats according to a designer's preference.

The social networking application 102 may be a dedicated application on the user device for connecting to the social networking system 120. For example on a mobile phone user device 100, the social networking application 102 can be a downloadable application obtained from the social networking system 120. In other embodiments, the social networking application 102 may be a portion of a website service provided by the social networking system 120. In another embodiment, the social networking application is an executable script downloaded from the social networking system 120. The social networking application 102 provides a user interface for the social networking system 120.

In one embodiment, the user chooses photos from among the user photos 101 for placement on the social networking system 120. Using the social networking application 102, the user can upload the chosen photos to the social networking system 120 for inclusion in a photo album 122. The user of the social networking application 102 may also add additional metadata, such as an album title, a description of each photo, tags, etc. to the chosen photos. The user may also control access rights to the photos in the album on a per-album or per-photo basis. In addition, the user may designate that certain connections are allowed or disallowed access. If the user has grouped connections into any groups, the access rights may also be controlled on a per-group basis.

The network 110 enables communications between the user device 100, social networking system 120 and viewing devices 130. In one embodiment, the network 114 uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 110 can also include links to other networks such as the Internet.

The viewing devices 130 provide access for other users of the social networking system who request access to the photo album 122. The viewing devices 130 are logged in to the social networking system and are connections of the user. The viewing devices 130 may be any connections of the user with some access privileges to the photo album 122. For example, if the user has not restricted the access privileges of the photo album at all, the viewing device users can comprise anyone. If the user has restricted access privileges of the photo album to connections in a group of "close friends," then the only viewing devices 130 that may access the photo album 122 are viewing devices 130 with a user belonging to the group of close friends.

The social networking system 120 provides social networking services to the user device 100 and the viewing devices 130. For example, typical social networking services allow users to complete a profile, post content, comment on other content, form and alter connections with other users, and the like. This information about a user and the user's social information are stored in a social network 121. The social network 121 includes information about the user's connections, interests, and other data provided to the social networking system. In addition, the social network 121 stores data for the viewing devices 130 and other users of the social networking system 120.

The social networking system 120 also provides photo album storage and serving services. After a user uploads certain user photos 101, the photos are stored in a photo album 122. The photo album 122 maintains the photos belonging to the album as well as any metadata associated with the album and with individual photos. The metadata stored with the photo album 122 includes metadata indicated by the user when the user uploaded the photo as well as other data collected after upload. For example, other users may comment on photos, indicate that they like a photo, tag a user in a photo, and initiate other social activity on the photo album.

In one embodiment, the social photo curation system 123 provides a system for automatically providing photo curation of the photo album 122. The social photo curation system 123 suggests a group of photos in the photo album 122 to comprise a viewing album 124. For example, when a viewing device 130 requests access to the photo album 122, the social photo curation system 123 can analyze the viewing device's 130 connection with the album 122 using the album metadata and the user social network 121. This analysis by the social photo curation system 123 results in a viewing album 124 for the individual viewing device 130. In an embodiment, rather than providing the entire photo album 122 to the viewing device 130, the social curation system 123 provides only the viewing album 124 to the viewing device 130. In another embodiment, the social curation system 123 provides the viewing album 124 to the viewing device 130 as a selected portion of the photo album 122, but also enables access to the remainder of the photo album 122.

Using the social photo curation system 123, the social networking system 120 tailors the photo album 122 to each viewing device 130 to create a viewing album 124 specific for the viewing device 130. In one embodiment, the social networking system 120 suggests the viewing album 124 to the user device 100, and the user device 100 provides feedback to confirm or modify the viewing album 124. Alternatively, the viewing album 124 is determined when the viewing devices 130 access the photo album and is not monitored by the user device 100.

Social Photo Curation System

Figure 2:
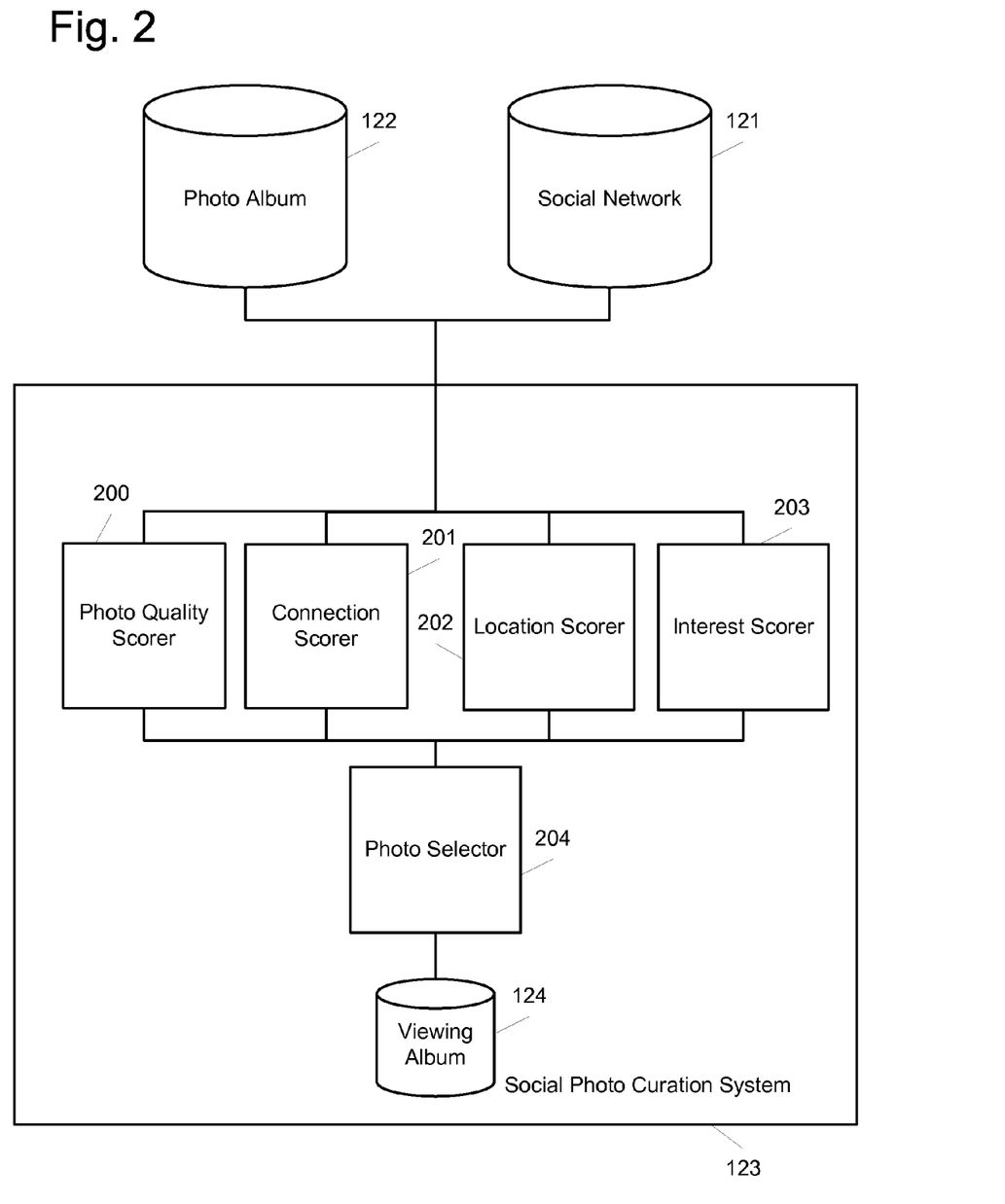
FIG. 2 is an example social photo curation system including several scorers.

An embodiment of a social photo curation system is provided in FIG. 2. As an overview, the social photo curation system includes several scoring functions which rate photos on a variety of metrics. The scoring functions assess the photos using the metrics and output a numerical score. The scoring functions assess the photos using information about the photos and the photo metadata. In one embodiment, the scoring functions also assess social profile information about the viewing user. The social profile information can include information about the viewing user's connections, activities on the social network, the viewing user's location information, and a viewing user's interests. Next, the photo scores are accumulated and compared to determine which photos should be used. The selected photos are grouped to develop a viewing album 124. First, the several scoring functions ("scorers") are described.

The social photo curation system 123 in one embodiment includes a photo quality scorer 200. The photo quality scorer 200 scores photos according to photo quality metrics. These photo quality metrics in various embodiments include measurements of focus, brightness, image noise, contrast, composition, sharpness, image artifacts, and other photo quality aspects. The photo scorer receives images as inputs, assesses the images according to the designated photo quality metrics, and produces a score indicating the image's assessment according to the used metrics.

Connection Score

The social photo curation system 123 in one embodiment includes a connection scorer 201. The connection scorer 201 scores photos according to the relationship of the viewer in relation to the photos. For example, the connection scorer 201 can identify the image contains an individual, and identify that individual as the viewing user's close friend and accordingly provide a high connection score to the image. The connection scorer can identify that the individual is the viewing user, a family member, a close friend, an acquaintance, or other social relationships. In order to provide connection scoring, the connection scorer 201 identifies individuals in the photo, and next assesses the identified individuals' connection to the viewing user.

The connection scorer 201 identifies individuals in a photo using a variety of methods. The identification of individuals may be performed by the connection scorer 201, or can be performed by a separate module. In one embodiment, the connection scorer 201 identifies individuals explicitly or implicitly in the photo. Explicit identification of an individual in the photo includes any tags which have been entered by the individual or by the photo owner. The explicit data is a reliable source for individual identification in the photo because it involves unambiguous user action.

Implicit information is also used in the identification of an individual in one embodiment. The implicit information can include any metadata about the photo. For example, an individual's name may be used in the photo in a way which enables identification of the user. Other metadata components can include a user's comments, user interaction, and other indications an individual is related to the photo. In one embodiment, an individual is identified with the photo if the user has commented on the photo. In one embodiment, facial recognition is used to identify an individual in the image.

Identified individuals can also be excluded from the list of identified individuals to be used in the connection scoring. For example, an individual who has previously removed his identification from the photo (e.g. a tag) may still be "identified" from the facial recognition, but his information would not be used in the scoring. In this way an individual's privacy is respected.

A list of identified individuals is compiled using the above methods. In one embodiment, the individuals identified using implicit methods are treated as less trustworthy and are flagged to give these individuals a reduced score in the connection scoring. In one embodiment, rather than the connection scorer 201 identifying the individuals in a photo, a list of identified individuals is provided by another module.

The connection scoring function uses the identified individual and the viewing user to determine the connection score. The scoring function can include a wide variety of factors in determining the relationship strength. Information about the viewing user's connections is obtained from the viewing user's social profile information. For example, the users may be related by an explicit relationship, such as the users forming a formal connection with another, which may include a descriptor (A is B's dad). Explicit information can also include any groups which each user belongs to. For example, users may have a "close friends" group or a "family" group to organize their connections. Such relationships are also used in one embodiment to indicate relationships of interest. In one embodiment, the connection is given additional weight if the identified user and the album owner are both members of the same group for the viewing user.

Implicit information can also be used to determine a connection strength between two users, such as membership in similar groups, or activity between the identified individual and the viewing user. For example, if the viewing user typically views and comments on the photos or profile of the identified user, the connection scorer 201 infers that the viewing user would be interested in viewing this photo of the identified user. Many other types of implicit information can be used to score a connection according to a designer's preference. In one embodiment, the implicit information is used to derive an affinity score for the viewing user. The affinity score can be calculated by the connection scorer 201, or it may be pre-existing data in the social networking system. Using the information about the connection between the users, the connection scorer 201 determines a score for the relationship. As an alternative, the social network 121 maintains a score to describe the relationship between users which is used by the connection scorer.

The connection scorer 201 has now calculated a score based on the connection between an individual and the viewing user. In one embodiment, for photos with more than one individual, the connection scores are combined to yield a final connection score. The combination can be additive, by a weighing, by using a maximum score, or other by methods.

Location Score

The location scorer 202 determines a score relating the viewing user to location information derived about the photo. Location information may be derived from the photo metadata, such as the album name, the photo description, or comments. Alternatively, location information could be extracted from photo image data or explicitly provided by a user who tags the photo with a location. In one embodiment, the photo is uploaded in connection with GPS data, which can be correlated with a database of GPS locations. The location information can also include timestamp information, if provided by the user or if embedded in the photo. This allows scoring to be performed to determine if the viewing user has any relationship to the location or location-time represented in the photo. The location and time information also have varying granularities, and can represent fine information, such as 12:34 P.M. on Sunday at 57 Broadway, or coarse information, such as July in New York.

The location information of the photos is scored by identifying the viewing user's relationship to the location information. The viewing user's location relationship can be identified from the viewing user's social profile information, such as the viewing user's permanent or temporary location. For example, the viewing user's permanent location may be listed in the user's profile. The location information can also represent historical locations, such as places the viewing user previously visited or lived. The viewing user's location information can be determined about the viewing user by the viewing user's profile information, the viewing user's photo metadata, the viewing user's presence in other photos of the album (suggesting the viewing user was a part of the event being catalogued), and viewing user's temporary location-related updates. In one embodiment, these location-related updates are provided by a user using a check-in feature of the social networking system.

Using the location information about the photo and the viewing user's location information, a score is determined relating the two. In one embodiment, the location scoring prioritizes similarities between the location information. That is, the closer the two pieces of information match in granularity, the higher score is given to the location information. Temporal information can be particularly relevant where available, as a viewing user who checks into a location ten minutes before the photo was taken would be expected to be more interested in the photo than a viewing user who checked into the location twelve hours after.

Interest Scorer

An additional interest scorer 203 is also used in an embodiment to identify interests of the viewing user that are represented in the photo. For example, interests can be extracted from the viewing user's profile, such as sports teams, musical tastes, activities, etc. Where these interests are identified in a photo, the photo can be provided a favorable interest score.

Interests can be extracted from the photo in a variety of ways. For example, interests can be extracted by referencing the metadata, such as the photo description or the commentary. In one embodiment, interest information is extracted by identifying portions of the raw photo. For example, sports logos can be identified in the photo and are associated with a viewing user's interest in that team. In addition, the location information can also be used to identify an interest. For example, a user who checks in or submits a photo with GPS information may indicate they are at a stadium at a particular time. This information is used to identify a game which was being played. The particular teams, stadium, or sport may each be of interest to the viewing user. A viewing user's interest information can be determined from the viewing user's social profile information. The interest scorer 203 uses the viewing user's interest information along with the photo's extracted interest information to generate an interest score for the photo relative to the viewing user.

Score Processing

After the scorers 200-203 have provided a score for each photo, the photo selector 204 identifies which photos to include in the viewing album 124. The photo selector 204 first determines a score for each photo in the album according to the scorers 200-203. After scoring, the photos are compared to one another to determine which photos received the highest scores. The scores can also be weighed or combined to calculate a single combined score for each photo. The scores can also be used to determine the number of photos. When the scores for the photos are high, the photo selector 204 will maintain a higher percentage of the photos compared to when the scores are low.

Alternative embodiments select the number of photos in a variety of ways. For example, the system may also take as an input the number of photos to select, or the photo selector 204 may select only those photos which achieve a certain score output. In one embodiment, the selector excludes photos that scored too similarly to other selected photos and therefore attempts to include photos that have a variety of score distributions. For example, several photos that score the same from the connection scorer 201 might be excluded, while the final composition would include some photos that scored well on the connection scorer 201, some photos that scored better on the photo quality scorer 200, and some photos that scored better on the location scorer 202. The photos selected are then used by the viewing album 124 to provide a selection of photos to the viewing user.

One embodiment selects diverse photos based on the metadata of the photos. The scores are calculated as described above. Next, the highest scoring photo can be selected. The selected photo is assessed to determine any associated metadata, such as tagged individuals. The metadata of the selected photo is used to adjust the scores of the other photos. For example, metadata can be compared to the metadata of the presently unselected photos. The unselected photos that have similar metadata have the scores adjusted downward, and the unselected photos that have dissimilar metadata have the scores adjusted upward. Another photo is selected with the adjusted scores, and new adjustments are calculated the unselected photos relative to the metadata of the new group of selected photos.

Social Photo Curation Processing

Figure 3:
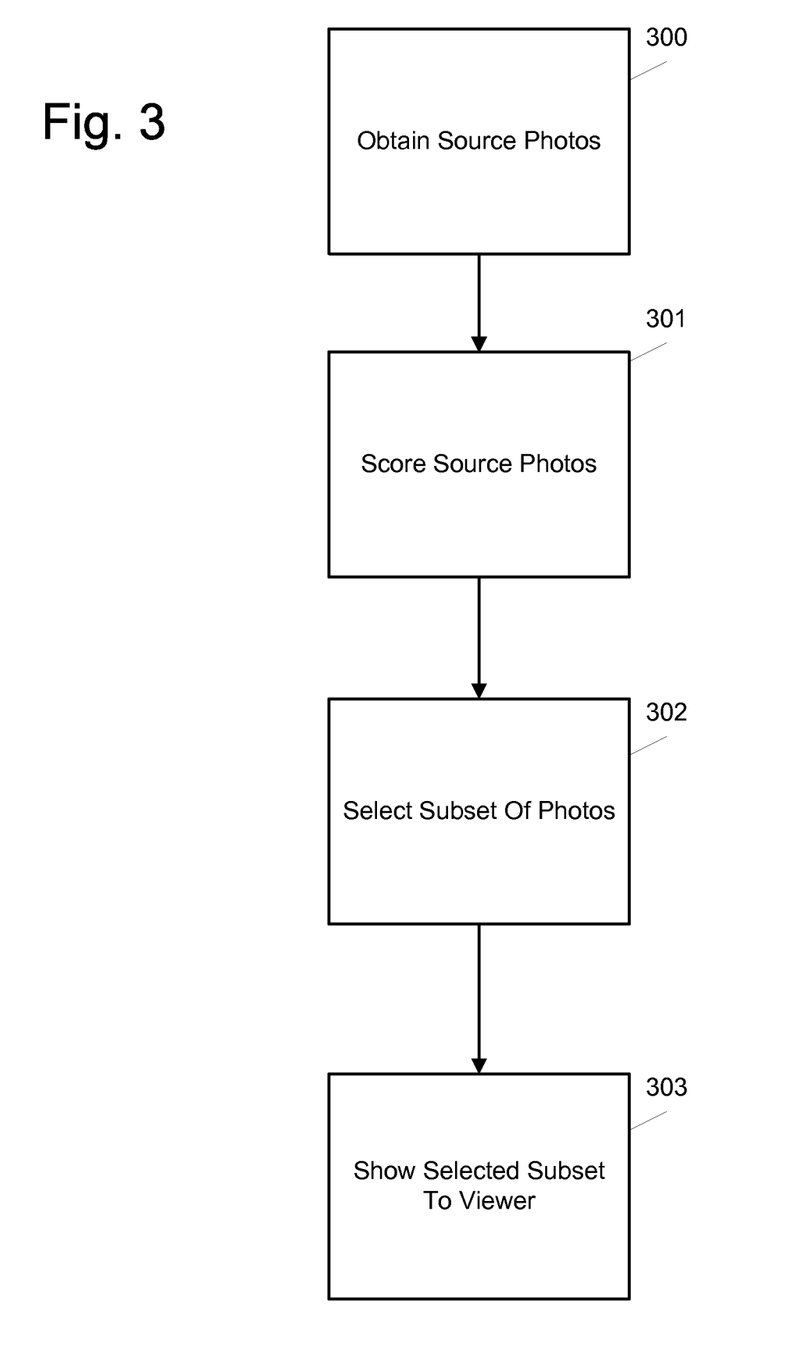
FIG. 3 is an example process for identifying a selection of photos from an album using a social photo curation system.

Referring now to FIG. 3, a method for automatically curating photos is shown. In one embodiment, this method is performed by the social networking system 120 and more specifically is performed by the social photo curation system 123. First, a group of source photos is obtained 300. The source photos in one embodiment are in a photo album uploaded to the social networking system 120.

Next, the source photos are scored 301 according to a variety of factors. In one embodiment, these factors include photo quality, connections, locations, and interests. The factors are evaluated relative to the viewing user and the information identified for the photo associated with each of these factors. These factors are scored 301 as outlined above to identify the information about the photo which is likely to be of interest to the viewing user based on information available to the social network.

After scoring 301, a subset of the source photos is selected 302, where the identified subset is likely to be of interest to the viewing user. The subset can be a specific size provided to the automatic photo curator, or the subset can be automatically determined based on the photo scores. The subset can be selected in a similar manner as described above relative to photo selector 204. Finally, the process shows 303 the subset of photos to the viewing user.

SUMMARY

The photo scoring and selection system described above can be used in a variety of applications. For example, though described in relation to a viewing user, these techniques can also be used for a group of viewing users. By scoring for a group of viewing users, the system can also be used to suggest viewing albums on a group basis. In one embodiment, the group suggestions are used to suggest viewing albums to the album owner prior to uploading photos. In this embodiment, the user may run an application prior to uploading photos to the social networking system. The suggested viewing albums are then used by the user as a preliminary suggestion for setting group permissions.

In another embodiment, the social photo curation system is used to identify photos for a user to upload to the social networking system. For example, in many instances a user has a large number of photos for possible inclusion in an album in the social networking system, but the selection of individual photos is tedious. The social photo curation system is used to automatically identify photos likely to be of interest to the user and the user's connections. The identified photos can be automatically used to create an album, or can provide suggested photos to the user.

In one embodiment, rather than scoring photos relative to a viewing user or the user connections, the scoring is performed using relationship information derived from the tags associated with the photos. The tags can be used to determine whether the photo is likely to be of interest based on relationships determined from the tags. For example, the tags may identify individuals in the photos who are users of the social networking system. The social networking system can determine relationships between users who are placed in the same photo together. For example, if a photo includes two people who have a strong connection to one another, the photo scores more highly than a photo with two people who have a weak or no connection to one another. In addition, a photo tagged with an interest that matches an interest of a user tagged in the photo can score higher than a similar photo taken with a user who is disinterested in the tag interest. Tags can be used without relying on social information as well, such as scoring photos higher which have more tags overall relative to other photos, or scoring photos with a number of faces.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
storing user profiles for each of a plurality of users of a social networking system;
storing information for each of a plurality of objects in the social networking system;
storing a plurality of connections between each of the plurality of the users and the other users or objects in the social networking system;
accessing a plurality of images provided by a posting user of the plurality of users;
receiving a request from a viewing user of the plurality of users to access an album, the album comprising a set of images selected from the plurality of images;
identifying one or more tagged objects in the images in the album, where a tagged object is an object of the plurality of objects in the social networking system;
computing a plurality of types of scores for one or more of the plurality of images, where the plurality of the types of scores for an image are based at least in part on an association between information from a user profile of the viewing user and the one or more tagged objects in the image;
adjusting one or more of the computed plurality of types of scores to select a subset of the plurality of images based on the computed scores such that the selected subset of the plurality of images is diverse with respect to the types of scores, the subset selected based on the types of the scores for the images;
sending for display to the viewing user an album, the album comprising the selected subset of the plurality of images.

2. The computer-implemented method of claim 1, wherein the tagged objects identify one or more other users who are tagged in the image, and the user profile includes information about the viewing user's connections, and further wherein the scoring step further includes the calculation of a connection score using the tagged users and the viewing user's connections.

3. The computer-implemented method of claim 1, wherein the scoring step further includes the calculation of a photo quality score, wherein the photo quality score measures at least one of focus, brightness, image noise, contrast, composition, sharpness, and image artifacts.

4. The computer-implemented method of claim 1, wherein the scoring step further includes the calculation of a location score, wherein the tagged objects identify one or more tagged locations in the image, and the user profile includes information about the viewing user's location connections; wherein the location score includes a calculation using the tagged locations and the viewing user's location connections.

5. The computer-implemented method of claim 1, wherein the scoring step further includes the calculation of an interest score, wherein the tags identify one or more interests tagged in the image, and the user profile includes information about the viewing user's interest information; wherein the interest score includes a calculation using the interests tagged and the viewing user's interest information.

6. The computer-implemented method of claim 1, wherein the viewing user comprises a group of viewing users.

7. The computer-implemented method of claim 1, wherein the score for an image is further based in part on tagged objects associated with the other images in the plurality of images.

8. A computer-implemented method comprising:
storing user profiles for each of a plurality of users of a social networking system;
storing information for each of a plurality of objects in the social networking system;
storing a plurality of connections between each of the plurality of the users and the other users or objects in the social networking system;
accessing a plurality of images provided by a posting user of the plurality of users;
receiving a request from a viewing user of the plurality of users to access an album, the album comprising a set of images selected from the plurality of images;
identifying one or more tagged objects in the images in the album, where a tagged object is an object of the plurality of objects in the social networking system;
computing scores of different types for one or more of the plurality of images, where one or more of the scores for an image is based at least in part on an association between information from a user profile of the viewing user and the one or more tagged objects in the image;
computing a composite score for one or more of the plurality of images comprising adjusting one or more computed scores of different types such that a subset of the plurality of images to be selected is diverse with respect to the types of scores, wherein the composite score comprises the scores of different types;
selecting the subset of the plurality of images based on the computed composite scores; and
sending for display to the viewing user an album, the album comprising the selected subset of the plurality of images.

9. The computer-implemented method of claim 8, wherein the tagged objects identify one or more other users who are tagged in the image, and the user profile includes information about the viewing user's connections, and further wherein the scoring step further includes the calculation of a connection score using the tagged users and the viewing user's connections.

10. The computer-implemented method of claim 8, wherein one of the different types of scores is a photo quality score, wherein the photo quality score measures at least one of focus, brightness, image noise, contrast, composition, sharpness, and image artifacts.

11. The computer-implemented method of claim 8, wherein one of the different types of scores is a location score, wherein the tagged objects identify one or more tagged locations in the image, and the user profile includes information about the viewing user's location connections; wherein the location score includes a calculation using the tagged locations and the viewing user's location connections.

12. The computer-implemented method of claim 8, wherein one of the different types of scores is an interest score, wherein the tags identify one or more interests tagged in the image, and the user profile includes information about the viewing user's interest information; wherein the interest score includes a calculation using the interests tagged and the viewing user's interest information.

13. The computer-implemented method of claim 8, wherein the viewing user comprises a group of viewing users.

14. The computer-implemented method of claim 8, wherein the score for an image is further based in part on tagged objects associated with the other images in the plurality of images.

15. A computer-implemented method comprising:
storing user profiles for each of a plurality of users of a social networking system;
storing information for each of a plurality of objects in the social networking system;
storing a plurality of connections between each of the plurality of the users and the other users or objects in the social networking system;
accessing a plurality of images provided by a posting user of the plurality of users;
receiving a request from a viewing user of the plurality of users to access an album, the album comprising a set of images selected from the plurality of images;
identifying one or more tagged objects in the images in the album, where a tagged object is an object of the plurality of objects in the social networking system;
computing a score using a plurality of scoring functions for one or more of the plurality of images comprising adjusting one or more metrics of a plurality of metrics of the plurality of scoring functions such that a subset of the plurality of images to be selected is diverse with respect to the types of scores, where the plurality of scoring functions use the plurality of metrics to compute the score and the score for an image is based at least in part on an affinity between information from a user profile of the viewing user and the one or more tagged objects in the image;
selecting the subset of the plurality of images based on the computed scores; and
sending for display to the viewing user an album, the album comprising the selected subset of the plurality of images.

16. The computer-implemented method of claim 15, wherein the tagged objects identify one or more other users who are tagged in the image, and the user profile includes information about the viewing user's connections, and further wherein the scoring step further includes the calculation of a connection score using the tagged users and the viewing user's connections.

17. The computer-implemented method of claim 15, wherein the scoring step further includes the calculation of a photo quality score, wherein the photo quality score measures at least one of focus, brightness, image noise, contrast, composition, sharpness, and image artifacts.

18. The computer-implemented method of claim 15, wherein the scoring step further includes the calculation of a location score, wherein the tagged objects identify one or more tagged locations in the image, and the user profile includes information about the viewing user's location connections; wherein the location score includes a calculation using the tagged locations and the viewing user's location connections.

19. The computer-implemented method of claim 15, wherein the scoring step further includes the calculation of an interest score, wherein the tags identify one or more interests tagged in the image, and the user profile includes information about the viewing user's interest information; wherein the interest score includes a calculation using the interests tagged and the viewing user's interest information.

20. The computer-implemented method of claim 15, wherein the viewing user comprises a group of viewing users.

* * * * *